United States Patent [19]
Kuwajima et al.

[11] Patent Number: 5,151,125
[45] Date of Patent: Sep. 29, 1992

[54] AQUEOUS COATING COMPOSITION

[75] Inventors: Teruaki Kuwajima, Higashiosaka; Shinichiro Umeda, Kyoto; Masakazu Watanabe, Toyonaka; Sakuichi Konishi, Ikoma, all of Japan

[73] Assignee: Nippon Paint Co., Ltd., Osaka, Japan

[21] Appl. No.: 703,804

[22] Filed: May 21, 1991

[30] Foreign Application Priority Data

May 21, 1990 [JP] Japan .................................. 2-130862

[51] Int. Cl.$^5$ ............................................... C08K 5/00
[52] U.S. Cl. .................................. 106/503; 523/406; 106/404; 106/415
[58] Field of Search ......................... 106/404, 499, 503

[56]         References Cited
       U.S. PATENT DOCUMENTS

| | | | |
|---|---|---|---|
| 4,487,861 | 12/1984 | Winner | 523/428 |
| 4,522,961 | 6/1985 | Martino | 523/407 |
| 4,600,754 | 7/1986 | Winner | 525/531 |

FOREIGN PATENT DOCUMENTS

| | | | |
|---|---|---|---|
| 10175035 | 9/1984 | European Pat. Off. | |
| 20305850 | 8/1988 | European Pat. Off. | |

Primary Examiner—William R. Dixon, Jr.
Assistant Examiner—Margaret V. Einsmann
Attorney, Agent, or Firm—Wenderoth, Lind & Ponack

[57]                ABSTRACT

Disclosed is an aqueous metallic coating composition which significantly reduces the production of hydrogen gas and does not have the problems which are brought about from hydrophobic segments. The composition can be stored for a long period of time and provide a metallic coating having good appearance and film properties (e.g. water resistance and adhesive properties with substrates). The aqueous coating composition of the present invention comprises (a) an acryl resin having a number average molecular weight of 1,000 to 50,000, an acid value of 15 to 200 and a hydroxyl value of 20 to 200, prepared by copolymerizing an ethylenic monomer and a phosphate monomer represented by $$CH_2=\underset{\underset{X}{|}}{C}-CO-(OY)_n-OPO(OH)_2 \qquad (I)$$

[wherein X represents a hydrogen atom or a methyl group, Y represents an alkylene group having 2 to 4 carbon atoms and n is an integer of 3 to 30.] and (b) a pigment;

the acryl resin being present in an amount of 2 to 500 parts by weight, based on 100 parts by weight of the pigment.

9 Claims, No Drawings

AQUEOUS COATING COMPOSITION

FIELD OF THE INVENTION

The present invention relates to an aqueous coating composition, more particularly an aqueous metallic coating composition which, when cured, has good water resistance and good adhesive properties.

BACKGROUND OF THE INVENTION

Metallic gloss finish has been widely employed on steel products and other metal goods (e.g. automobile bodies). The finish is generally formed by coating so-called "metallic" paint which contains granulated metal pigment, such as aluminum powder or flakes.

Hitherto, the metallic paint has been generally organic solvent borne, but it is cautioned nowadays that organic solvent is associated with environment pollutions. It is therefore proposed to replace the organic solvent for water. However, the use of water in turn provides a problem that water is reacted with metallic pigment to produce hydrogen gas which is dangerous. This problem is more serious in automobile industry in which paint is stored in a closed container for a relatively long period of time before use.

In order to overcome the problem associated with the metallic pigment, especially aluminum pigment, many approaches are proposed. For example, Japanese Kokai Publication 58-168670 discloses that the aluminum pigment is treated with phosphoric esters and formulated into an aqueous coating composition. The coating composition, when coated on the substrate, has poor water resistance and poor peeling resistance.

Japanese Kokai Publication 61-47771 based on UK Ser. No. 849719 discloses an aqueous metallic coating composition which contains a reaction product of orthophosphoric acid and an epoxy compound. Also, Japanese Kokai Publication 1-190765 based on U.S. Ser. No. 130,922 discloses an aqueous metallic coating composition which contains an acryl polymer modified with orthophosphoric acid. The both coating compositions still are poor in adhesive properties with a substrate.

DE-OS 3,020,073 discloses that metallic pigment is mixed with a phosphoric ester of a long chain alcohol to form a pigment paste composition which is dispersible in water. In this technique, the phosphoric ester is strongly adhered on the surface of the metallic pigment which, therefore, does not contact with an aqueous medium, thus no hydrogen gas being produced. EP-AI-0133644 proposes a stabilizing technique of metallic pigment, using a compound prepared by neutralizing a phosphoric ester of alkyl phenols with an amine. This compound also has the same function as the phosphoric ester of DE-OS 3,020,073. However, the compounds used in these two patents have hydrophobic segments and require large amounts of an emulsifier to sufficiently disperse the pigment in an aqueous medium. If the emulsifier is not used in such large amounts, the pigment particles agglomerate and therefore provide poor surface appearance. The large amounts of the emulsifier adversely affect on water resistance and adhesive properties with the substrate.

SUMMARY OF THE INVENTION

The present invention provides an aqueous metallic coating composition which significantly reduces the production of hydrogen gas and does not have the problems which are brought about from hydrophobic segments. The composition can be stored for a long period of time and provide a metallic coating having good appearance and film properties (e.g. water resistance and adhesive properties with substrates). The aqueous coating composition of the present invention comprises (a) an acryl resin having a number average molecular weight of 1,000 to 50,000, an acid value of 15 to 200 and a hydroxyl value of 20 to 200, prepared by copolymerizing an ethylenic monomer and a phosphate monomer represented by

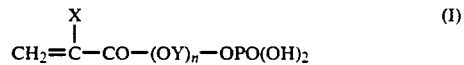

[wherein X represents a hydrogen atom or a methyl group, Y represents an alkylene group having 2 to 4 carbon atoms and n is an integer of 3 to 30.] and (b) a pigment;

the acryl resin being present in an amount of 2 to 500 parts by weight, based on 100 parts by weight of the pigment.

DETAILED DESCRIPTION OF THE INVENTION

The acryl resin (a) is prepared from the ethylenic monomer and the phosphate monomer represented by the formula (I). The phosphate monomer may be prepared by a conventional method, for example reacting (meth)acrylic acid with an alkylene oxide to form a polyalkylene glycol monoester which is then reacted with orthophosphoric acid. The term "(meth)acryl" herein means either acryl or methacryl. Phosphorus oxychloride, metaphosphoric acid, phosphoric anhydride, phosphorus trichloride, phosphorus pentachloride and the like may be also employed as a phosphatizing agent instead of orthophosphoric acid, but the final product may be hydrolized to introduce a hydroxyl group bonded to the phosphorus atom if necessary. An amount of the alkylene oxide is stoichiometrically n mol according to the number n in the formula (I), but may be excess. The alkylene oxide preferably used in 3 to 60 mol based on one mol of (meth)acrylic acid. The alkylene oxide has 2 to 4 carbon atoms and examples of the alkylene oxides are ethylene oxide, propylene oxide and butylene oxide. The addition reaction of the alkylene oxide may be conducted at 40° to 200° C. for 0.5 to 5 hours in the presence of a catalyst (e.g. potassium hydroxide and sodium hydroxide) in a solvent (e.g. n-methylpyrrolidone). After the addition reaction, the monoesterification reaction may be conducted at a temperature of 0 to 100 for 0.5 to 5 hours. The phophatizing agent may be used in stoichiometric amounts, preferably 1 to 3 mol based on the oxyalkyleneoxide-added compound. Typical examples of the phosphate monomers are acid phosphoxyhexa(oxypropylene) mono(meth)acrylate, acid phosphoxydodeca(oxypropylene) mono(meth)acrylate, acid phosphoxyhexa(oxyethylene) mono(meth)acrylate, acid phosphoxydodeca(oxyethylene) mono(meth)acrylate and the like.

The ethylenic monomer is copolymerizable with the phosphate monomer (I). Since the acryl resin (a) has acid value and hydroxyl value, the ethylenic monomer is generally selected from acid group-containing monomers, hydroxyl group-containing monomers and the other ethylenic monomers. Examples of the acid group-containing monomers are carboxylic group-containing monomers, such as acrylic acid, methacrylic acid, crotonic acid, ethacrylic acid, propylacrylic acid, isopropylacrylic acid, itaconic acid, maleic anhydride and fumaric acid; sulfonic acid group-containing monomers, such as t-butylacrylamide sulfonic acid; and the like. Examples of the hydroxyl group-containing monomers are hydroxyethyl acrylate, hydroxypropyl acrylate, hydroxybutyl acrylate, hydroxymethyl methacrylate, hydroxypropyl methacrylate, hydroxybutyl methacrylate, N-methylolacrylamide, allyl alcohol and the like. Examples of the other ethylenic monomers are (meth)acrylates, such as methyl (meth)acrylate, ethyl (meth)acrylate, isopropyl (meth)acrylate, n-propyl (meth)acrylate, n-butyl (meth)acrylate, t-butyl (meth)acrylate, 2-ethylhexyl (meth)acrylate, n-octyl (meth)acrylate, lauryl (meth)acrylate, stearyl (meth)acrylate and dodecyl (meth)acrylate; a reaction product of a fatty acid and an oxirane group-containing (meth)acrylate, such as a reaction product of stearic acid and glycidyl methacrylate; a reaction product of an oxirane compound having at least three carbon atoms and (meth)acrylic acid, such as compounds described in Japanese Kokoku Publications 58-3185 and 60-9322; styrene derivatives, such as styrene, alphamethylstyrene, o-methylstyrene, m-methylstyrene, p-methylstyrene and p-t-butylstyrene; benzyl (meth)acrylate; itaconates, such as dimethyl itaconate; maleates, such as dimethyl maleate; fumarates, such as dimethyl fumarate; (meth)acrylonitrile; vinyl acetate; and the like.

The acryl resin (a) of the present invention is prepared by copolymerizing the ethylenic monomer and phosphate monomer by a conventional method. For example, a monomer mixture is mixed with a polymerization initiator (e.g. azobisisobutylonitrile) and then added dropwise to a solvent (e.g. ethoxy propanol) which has been heated to a polymerization temperature. The phosphate monomer (I) is employed in an amount of 100 parts by weight, based on 200 to 5,000 parts by weight of the ethylenic monomer. If an amount of the phosphate monomer (I) is less than 100 parts by weight, the cured film has poor water resistance. If an amount of the phosphate monomer (I) is more than 100 parts by weight, the effect of the phosphate groups is not in proportion to the increase of amount.

In the present invention, the acryl resin has a number average molecular weight of 1,000 to 50,000. Molecular weights of less than 1,000 reduce adhesive properties and those of more than 50,000 make the obtained composition too viscous and make it difficult to treat. The resin also has an acid value of 15 to 200 in which 10 to 150 is provided from phosphoric acid and the remaining is provided from the acid group-containing ethylenic monomers Acid values of less than 15 provide poor wettability and peeling may occur. Those of more than 200 reduce water resistance. If the acid value from the phosphoric acid is more than 150, the cured film has poor water resistance. If that from the phosphoric acid is less than 10, the technical effects of the present invention are too low. The acryl resin further has a hydroxyl value of 20 to 200. Hydroxyl values of less than 20 reduce water resistance because of insufficient cure and those of more than 200 also reduce water resistance because of high hydrophilic properties.

The pigment (b) of the present invention can be any one which is employed in coating compositions, including an inorganic pigment, such as iron oxide, zinc oxide and the like; an organic pigment, such as cyanine blue and cinquacia red; and a metallic pigment, such as aluminum, copper, zinc, iron, nickel, tin, an alloy thereof and mica. The metallic pigment is preferred. The shape of the metallic pigment is not limited, but preferably scale like shape.

The aqueous coating composition of the present invention may contain a film-forming polymer which is known to the art. Examples of the film-forming polymers are addition polymers, such as aqueous acryl resin and aqueous vinyl polymer; condensation polymers, such as aqueous polyester, alkyd, polyurethane and polyamine; and the like.

The coating composition may also contain a curing agent. Examples of the curing agents are melamine resin (e.g. Cymel 303 (methoxymethylol melamine available from Mitsui Toatsu Chemicals Inc.)), blocked polyisocyanates and epoxy resins.

The coating composition may further contain additives, such as a thickener, a surface treating agent and the like.

The aqueous coating composition of the present invention may contain 2 to 500 parts by weight, preferably 5 to 400 parts by weight of the acryl resin (a), 200 to 4,000 parts by weight of the film forming polymer and 50 to 2,000 parts by weight of the curing agent, based on 100 parts by weight of the pigment (b). If an amount of the acryl resin is less than 2 parts by weight, the technical effects of the present invention are not imparted. If an amount of the acryl resin is more than 500 parts by weight, the water resistance of the cured film is poor.

The aqueous coating composition may be prepared by uniformly mixing the above mention components in an aqueous medium. The aqueous medium mainly contains water, but an organic solvent (e.g. alcohols, aromatic hydrocarbons, ketones and esters) may be added thereto to improve dispersibility. For mixing, order of addition and addition conditions (e.g. temperatures) are not limited.

The aqueous coating composition may be prepared by mixing the acryl resin (a) and the pigment (b) to form a pigment paste which is then mixed with the other components. The pigment paste may be prepared by uniformly mixing the acryl resin (a), the pigment (b) and optionally the above mentioned solvent and the curing agent. Mixing can be carried out by a mixer. If the solvent is employed, it is preferred that the paste is condensed after mixing.

In the present invention, the acryl resin (a) improves the dispersibility of the metallic pigment in comparison with the conventional aqueous metallic paint. The phosphoric acid group present in the acryl resin also functions as curing catalyst to enhance curing ability. The obtained coating composition, when cured, has excellent water resistance and high adhesive properties with the substrate.

EXAMPLES

The present invention is illustrated by the following Examples which, however, are not to be construed as limiting the present invention to their details.

PREPARATION OF ACRYL VARNISH

Production Example 1

A one liter reaction vessel, equipped with a stirrer, a temperature controller and a condenser, was charged with 40 parts by weight of ethoxy propanol. Separately a monomer solution was prepared from 4 parts by weight of styrene, 35.96 parts by weight of n-butyl acrylate, 18.45 parts by weight of ethylhexyl methacrylate, 13.92 parts by weight of 2-hydroxyethyl methacrylate, 7.67 parts by weight of methacrylic acid, 40 parts by weight of a solution of 20 parts by weight of acid phosphoxyhexa(oxypropylene) monomethacrylate (Phosmer PP available from Uni Chemical Co., Ltd.), and 1.7 parts by weight of azobisisobutylonitrile. To the reaction vessel, 121.7 parts by weight of the monomer solution was added dropwise at 120° C. over 3 hours and then mixed for another one hour to obtain an acryl varnish having an acid value of 105, an OH value of 60, a number average molecular weight of 6,000 and a nonvolatile content of 63%.

Production Example 2

An acryl varnish was prepared as generally described in Production Example 1, with the exception that a monomer solution which was prepared from 8.81 parts by weight of styrene, 11.01 parts by weight of methyl methacrylate, 46.26 parts by weight of n-butyl acrylate, 13.92 parts by weight of 2-hydroxyethyl methacrylate, 43.5 parts by weight of a solution of 23.5 parts by weight of acid phosphoxydodeca(oxypropylene) monomethacrylate (Phosmer 12PP available from Uni Chemical Co., Ltd.) and 1.7 parts by weight of azobisisobutylonitrile was employed. The resulting varnish had an acid value of 30, an OH value of 60, a number average molecular weight of 6,000 and a nonvolatile content of 62%.

Production Example 3

A one liter reaction vessel, equipped with a stirrer, a temperature controller and a condenser, was charged with 76 parts by weight of ethyleneglycol monobutyl ether. Separately a monomer solution was prepared from 15 parts by weight of styrene, 63 parts by weight of methyl methacrylate, 48 parts by weight of 2-hydroxydiethyl methacrylate, 117 parts by weight of n-butyl acrylate, 27 parts by weight of methacrylic acid, 30 parts by weight of acrylamide and 3.0 parts by weight of azobisisobutylonitrile. To the reaction vessel, 61 parts by weight of the monomer solution was added dropwise and heated to 120° C., to which another 245 parts by weight of the monomer solution was added dropwise over 3 hours and then mixed for another one hour. To the content, 28 parts by weight of dimethylethanolamine and 200 parts by weight of deionized water were added to obtain an acryl varnish having an acid value of 58, an OH value of 70, a number average molecular weight of 12,000 and a nonvolatile content of 50%.

Preparation of clear paint

Production Example 4

A clear paint was prepared by mixing the following ingredients in a stainless vessel.

| Ingredients | Parts by weight |
| --- | --- |
| Varnish[1] | 100 |
| Uban 20 SE-60 | 36 |
| Modaflow (available from Monsant Company) | 0.5 |
| Resin particles[2] | 2.2 |

[1] A reaction vessel, equipped with a stirrer, a temperature controller and a condenser, was charged with 70 parts by weight of xylene and 20 parts by weight of n-butanol. Separately a monomer solution was prepared from 1.2 parts by weight of methacrylic acid, 26.4 parts by weight of styrene, 26.4 parts by weight of methyl methacrylate, 36.0 parts by weight of n-butyl acrylate, 10.0 parts by weight of 2-hydroxyethyl acrylate and 1.0 part by weight of azobisisobutylonitrile. To the reaction vessel, 20 parts by weight of the monomer solution was added and heated with stirring. The remaining 81.0 parts by weight of the monomer solution was added dropwise for 2 hours with refluxing, to which a solution of 0.3 parts by weight of azobisisobutylonitrile and 10 parts by weight of xylene was added dropwise for 30 minutes. The resultant solution was further refluxed for 2 hours to obtain an acryl varnish having an OH value of 48, a number average molecular weight of 8,000 and a nonvolatile content of 50%.

[2] A one liter reaction vessel, equipped with a stirrer, a temperature controller and a condenser, was charged with 282 parts by weight of deionized water, 10 parts by weight of a polyester resin (obtained note 3 hereinafter) and 0.75 parts by weight of dimethylethanolamine and mixed at 80° C. to dissolve the content. A solution of 45 parts by weight of azobiscyanovaleric acid, 45 parts by weight of deionized water and 4.3 parts by weight of dimethylethanolamine was added, and then a monomer mixture of 70.7 parts by weight of methyl methacrylate, 94.2 parts by weight of n-butyl acrylate, 70.7 parts by weight of styrene, 30 parts by weight of 2-hydroxyethyl acrylate and 4.5 parts by weight of ethyleneglycol dimethacrylate was added dropwise for 60 minutes. After completion of addition, a solution of 1.5 of azobiscyanovaleric acid, 15 parts by weight of deionized water and 1.4 parts by weight of dimetehylethanolamine was added and mixed at 80° C. for 60 minutes to obtain an emulsion having a particle size of 0.156 micron, a nonvolatile content of 45%, pH 7.2 and a viscosity of 92 cps (25° C.). The obtained emulsion was spray-dried to remove water and redispersed in 200 parts by weight of xylene based on 100 parts by weight of the resin particles. The obtain dispersion had a particle size of 0.3 micron.

[3] Preparation of polyester resin
A 2 liter reaction vessel, equipped with a stirrer, a nitrogen gas introducing tube, a temperature controller, a conderser and a decanter, was charged with 134 parts by weight bishydroxyethyltaurine, 130 parts by weight of neopentyl glycol, 236 parts by weight of azelaic acid, 186 parts by weight of phthalic anhydride and 27 parts by weight of xylene, and heated to azeotropically remove water with xylene. After starting reflux, it was slowly heated to 190°C. over about 2 hours and then mixing and dehydration continued until an acid value of the carboxylic group reached 145. It was then cooled to 140° C. at which 314 parts by weight of versatic glycidyl ester (available from Shell Chemical Company as Cardure E 10) was added dropwise for 30 minutes. Thereafter, mixing continued for 2 hours to terminate reaction. The obtained polyester resin had 59 acid value, 90 hydroxyl value and Mn 1,054.

Production Example 5

A clear paint was prepared by mixing the following ingredients in a stainless vessel.

| Ingredients | Parts by weight |
| --- | --- |
| Varnish[4] | 100 |
| Desmodule N-75 | 16.7 |

[4] A reaction vessel, equipped with a stirrer, a temperature controller and a condenser, was charged with 57 parts by weight of xylene and 6 parts by weight of n-butanol. Separately a monomer solution was prepared from 30.0 parts by weight of styrene, 45.2 parts by weight of ethylhexyl methacrylate, 5.5 parts by weight of ethylhexyl acrylate, 16.2 parts by weight of 2-hydroxyethyl methacrylate, 3.1 parts by weight of methacrylic acid and 4.0 part by weight of azobisisobutylonitrile. To the reaction vessel, 20 parts by weight of the monomer solution was added and heated with stirring. The remaining 84.0 parts by weight of the monomer solution was added dropwise for 2 hours with refluxing, to which a solution of 0.5 parts by weight of azobisisobutylonitrile, 23 parts by weight of xylene and 14 parts by weight of n-butanol was added dropwise for 20 minutes. The resultant solution was further refluxed for 2 hours to obtain an acryl varnish having an OH value of 70, a number average molecular weight of 3,400 and a nonvolatile content of 50%.

Production Example 6

A clear paint was prepared by mixing the following ingredients in a stainless vessel and diluting with a thinner of butyl acetate/xylene = 1/1.

| Ingredients | Parts by weight |
| --- | --- |
| Compound having carboxylic anhydride[5] | 130 |
| Blocked amine compound[6] | 25 |
| Compound having an alkoxysilyl[7] | 65 |
| Tinubin 900 | 1.5 |

-continued

| Ingredients | Parts by weight |
|---|---|
| Irukanox 1010 | 1.0 |

[5] A one liter reaction vessel, equipped with a stirrer, a temperature controller and a condenser, was charged with 120 parts by weight of butyl acetate and heated to 100° C. Separately a monomer solution was prepared from 21 parts by weight of n-butyl acrylate, 95 parts by weight of n-butyl methacrylate, 34 parts by weight of 2-ethylhexyl methacrylate, 45 parts by weight of itaconic anhydride, 60 parts by weight of dioxane and 20 parts by weight of t-butylperoxy hexanoate. To the reaction vessel, the monomer solution was added dropwise for 3 hours and mixed for another 2 hours to obtain an acryl resin having carboxylic anhydride groups. It had a number average molecular weight of 2,500 and a nonvolatile content of 51%.

[6] A reaction vessel, equipped with a stirrer, a condenser with a water separator and a thermometer, was charged with 133 g of diisopropanolamine and 70 g toluene, to which 76 g of isobutyl aldehyde was added dropwise for one hour while it was cooled with ice. Water was removed with refluxing for 5 hours and then 84 g of 1,6-hexane diisocyanate and 20 g of xylene were added dropwise for one hour. It was reacted at 70 to 80° C. for 8 hours to obtain a blocked amine compound.

[7] Preparation of a compound having alkoxy silyl group
A one liter reaction vessel, equipped with a stirrer, a temperature controller, a conderser and a decanter, was charged with 200 g of xylene, and heated to 120° C. Separately, a monomer solution was prepared from 150 g of 3-methacryloxypropyltrimethoxysilane, 20 g of n-butyl acrylate, 30 g of methyl methacrylate and 15 g of t-butylperoxy hexanoate. It was added dropwise to the reaction vessel over 3 hours, and then reacted for another 2 hours to obtain a polymer having an alkoxysilyl group with a number average molecular weight of 2,000 and a nonvolatile content of 52%.

Production Example 7

A clear paint was prepared by mixing the following ingredients in a stainless vessel and diluting with a thinner of butyl acetate/xylene=1/1.

| Ingredients | Parts by weight (g) |
|---|---|
| Compound having carboxylic anhydride[5] | 130 |
| Oxazolidine compound[8] | 13 |
| Compound having an alkoxysilyl[7] | 65 |
| 3,4-Epoxycyclohexylmethyl-3,4-epoxycyclohexane carboxylate | 7 |
| Tinubin 900 | 1.5 |
| Irukanox 1010 | 1.0 |

[8] A reaction vessel, equipped with a stirrer, a condenser with a water separator and a thermometer, was charged with 200 g of benzene and 133 g of diisopropanolamine, to which 75 g of isobutyl aldehyde was added dropwise at room temperature for one hour. Water was removed with refluxing for 5 hours and benzene was removed under reduced pressure to obtain a hydroxyoxazolidine compound. The water separator was detached and 1,000 g of hexane and 103 g of triethylamine were charged in the reaction vessel, to which 64.6 g of dichlorodimethylsilane was added dropwise for 2 hours. It was then reacted at room temperature for 2 hours and white precipitate was filtered away. The filtrate was condensed to obtain an oxazolidine compound.

PREPARATION OF AQUEOUS COATING COMPOSITION

Example 1

Fifteen parts by weight of an aluminum pigment paste (65% aluminum content available from Asahi Chemical Industry Co., Ltd. as Aqueous Aluminum Paste AW-666C) was uniformly mixed with 30 parts by weight of Cymel 303 (methoxylated methylol melamine available from Mitsui Toatsu Chemicals Inc.), to which 8 parts by weight of the acryl resin having phosphoric acid groups of Production Example 1 was added and uniformly mixed to obtain an aluminum pigment solution. It was then mixed with 140 parts by weight of the aqueous acryl resin of Production Example 3 to obtain an aqueous metallic paint.

Example 2

Fifteen parts by weight of an aluminum pigment paste (65% aluminum content available from Toyo Aluminum K.K. as Aluminum Paste 7160N) was uniformly mixed with 140 parts by weight of the aqueous acryl resin of Production Example 3, and then mixed with 30 parts by weight of Cymel 303 (methoxylated methylol melamine available from Mitsui Toatsu Chemicals Inc.). Separately, 2 parts by weight of isostearyl acidphosphate (available from Sakai Chemical Industry Co., Ltd. as Phoslex A-180L) was mixed with 5 parts by weight of the acryl resin having phosphoric acid group of Production Example 2, and then neutralized with triethylamine. The neutralized solution was added to the reaction vessel to obtain an aqueous metallic paint.

Comparative Example 1

An aqueous metallic coating composition was prepared as generally described in Example 1, with the exception that the acryl resin of Production Example 1 was not employed.

Comparative Example 2

According to Japanese Kokai Publication 1-190765, an aqueous metallic paint was prepared.

A one liter reaction vessel, equipped with a stirrer, a temperature controller and a condenser, was charged with 183 parts by weight of ethyleneglycol monobutyl ether and heated to 130° C. To the content, a monomer solution and an initiator solution were simultaneously added dropwise over 3 hours to react. The monomer solution contained 69.6 parts by weight of glycidyl methacrylate, 144.01 parts by weight of hydroxyethyl methacrylate, 98.4 parts by weight of methyl methacrylate and 120 parts by weight of lauryl methacrylate, and the initiator solution contained 24 parts by weight of azobisisobutylonitrile and 96 parts by weight of xylene. Thirty minutes later after completion of addition, a solution containing 3 parts by weight of azobisisobutylonitrile and 32 parts by weight of xylene was added dropwise for 15 minutes and then mixed at 130° C. for another 2 hours to terminate reaction. The resulting mixture was cooled to 50° C., to which 56.5 parts by weight of phosphoric acid (85%) was added and reacted at 50° C. for 2 hours to obtain a polymer solution having a nonvolatile content of 54.5%, an acid value of 71 and a molecular weight of 3,000.

Next, an aqueous metallic paint was prepared as generally described in Example 1, with the exception that the acryl resin obtained above was employed instead of the acryl resin of Production Example 1.

EVALUATION OF COATINGS

Tests 1 to 11

A polished mild steel plate was subjected to a degrease and chemical treatment, and then coated with an electrodeposition paint in an intermediate coating line to obtain an intermediate coated steel panel. It was then coated with the aqueous metallic paint as shown in Table 1, and then coated with the clear paint as shown in Table 1. The metallic paint was spray-coated at 23° C. and relative humidity of 60% so as to obtain a 20 micron layer, and the clear paint was also spray-coated at the same condition so as to obtain a 30 micron layer. The metallic paint was coated two stages with one minute interval and then preheated at 80° C. for 5 minutes. Then, the clear paint was coated one stage and subjected to a setting for 7 minutes. The coated panel was baked at 140° C. for 30 minutes and subjected to evaluations of adhesive properties and water resistance.

TABLE 1

| Test No. | Metallic paint (Example No.) | Clear paint Production Example No. | Adhesive property*1 | Water resistance*2 |
| --- | --- | --- | --- | --- |
| 1 | 1 | 4 | Good | Good |
| 2 | 1 | 5 | Good | Good |
| 3 | 1 | 6 | Good | Good |
| 4 | 1 | 7 | Good | Good |
| 5 | 2 | 4 | Good | Good |
| 6 | 2 | 5 | Good | Good |
| 7 | 2 | 6 | Good | Good |
| 8 | 2 | 7 | Good | Good |
| 9 | Comp. Ex. 1 | 4 | Bad | Bad |
| 10 | Comp. Ex. 1 | 7 | Bad | Bad |
| 11 | Comp. Ex. 2 | 4 | Bad | Bad |

*1 A cross cut was formed in the cured coating with a cutter knife and an adhesive tape was attached thereto and then peeled off. Good shows no peeling. Bad shows peeled.

*2 The coated panel was dipped in warm water at 50 C. for 10 days. The change of the surface was visually evaluated. Good shows substantially no change, and Bad shows blacken or color change.

What is claimed is:

1. An aqueous coating composition comprising
   (a) an acryl resin having a number average molecular weight of 1,000 to 50,000, an acid value of 15 to 200 and a hydroxyl value of 20 to 200, prepared by copolymerizing an ethylenic monomer and a phosphate monomer represented by

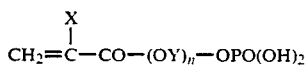    (I)

wherein X represents a hydrogen atom or a methyl group, Y represents an alkylene group having 2 to 4 carbon atoms and n is an integer of 3 to 30 and
   (b) a pigment;
   said acryl resin being present in an amount of 2 to 500 parts by weight, based on 100 parts by weight of said pigment.

2. The aqueous coating composition according to claim 1 wherein said ethylenic monomer is selected from the group consisting of acid group-containing monomers, hydroxyl group-containing monomers and acrylic monomers.

3. The aqueous coating composition according to claim 1 wherein said phosphate monomer is selected from the group consisting of acid phosphoxyhexa(oxypropylene) mono(meth)acrylate, acid phosphoxydodeca(oxypropylene) mono(meth)acrylate, acid phosphoxyhexa(oxyethylene) mono(meth)acrylate and acid phosphoxydodeca(oxyethylene) mono(meth)acrylate.

4. The aqueous coating composition according to claim 1 wherein said pigment (b) is selected from the group consisting of an inorganic pigment, an organic pigment and a metallic pigment.

5. The aqueous coating composition according to claim 1 wherein said pigment (b) is aluminum pigment.

6. The aqueous coating composition according to claim 1 further comprising a film-forming polymer and a curing agent.

7. The aqueous coating composition according to claim 6, comprising 2 to 500 parts by weight of said acryl resin (a), 200 to 4,000 parts by weight of said film forming polymer and 50 to 2,000 parts by weight of said curing agent, based on 100 parts by weight of said pigment (b).

8. A pigment paste for an aqueous coating composition comprising;
   (a) an acryl resin having a number average molecular weight of 1,000 to 50,000, an acid value of 15 to 200 and a hydroxyl value of 20 to 200, prepared by copolymerizing an ethylenic monomer and a phosphate monomer represented by

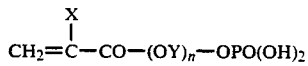    (I)

wherein X represents a hydrogen atom or a methyl group, Y represents an alkylene group having 2 to 4 carbon atoms and n is an integer of 3 to 30 and
   (b) a pigment;
   said acryl resin being present in an amount of 2 to 500 parts by weight, based on 100 parts by weight of said pigment.

9. The pigment paste according to claim 8 wherein said pigment is aluminum pigment or mica.

* * * * *